United States Patent [19]

Jackisch

[11] 4,152,276

[45] May 1, 1979

[54] PROCESS OF MAKING OLEFIN COPOLYMER LUBRICANT ADDITIVES BY PERMANGANATE OXIDATION OF OLEFIN TERPOLYMERS

[75] Inventor: Philip F. Jackisch, Royal Oak, Mich.

[73] Assignee: Ethyl Corporation, Richmond, Va.

[21] Appl. No.: 851,446

[22] Filed: Nov. 14, 1977

[51] Int. Cl.$^2$ .................. C10M 1/32; C10M 3/26; C10M 5/20; C10M 7/30

[52] U.S. Cl. .................. 252/51.5 A; 252/56 R; 252/55; 526/15; 526/47.7; 526/52.2; 526/52.3; 526/54

[58] Field of Search .................. 252/51.5 A, 56 R, 55; 526/15, 47.7, 52.2, 52.3, 54

[56] References Cited

U.S. PATENT DOCUMENTS

| | | | |
|---|---|---|---|
| 3,326,804 | 6/1967 | Hu | 252/51.5 A |
| 3,388,067 | 6/1968 | Takashima et al. | 252/52 R |
| 3,404,091 | 10/1968 | Zakashima et al. | 252/56 R |
| 3,445,387 | 5/1969 | Liston | 252/51.5 R |
| 3,687,849 | 8/1972 | Abbott | 252/51.5 A |
| 3,923,930 | 12/1975 | Waldbillig | 260/878 R |
| 4,002,569 | 1/1977 | Rubin et al. | 252/51.5 A |
| 4,007,121 | 2/1977 | Holder et al. | 252/51.5 A |
| 4,032,700 | 6/1977 | Song et al. | 526/43 |
| 4,068,056 | 1/1978 | Engel et al. | 252/51.5 A |

Primary Examiner—Delbert E. Gantz
Assistant Examiner—Irving Vaughn
Attorney, Agent, or Firm—Donald L. Johnson; Robert A. Linn; Joseph D. Odenweller

[57] ABSTRACT

Ethylene/$C_{3-12}$ α-monoolefin copolymers having an average molecular weight of about 10,000–1,000,000 containing about 1–10 pendent amide and/or ester groups per each 10,000 molecular weight are effective ashless dispersants and impart viscosity lift to lubricating oils. They are made by the permanganate oxidation of ethylene/$C_{3-12}$ α-monoolefin/non-conjugated diene terpolymers which oxidizes the residual olefinic double bond of the diene unit to a carboxylic acid which is amidated and/or esterified.

28 Claims, No Drawings

PROCESS OF MAKING OLEFIN COPOLYMER LUBRICANT ADDITIVES BY PERMANGANATE OXIDATION OF OLEFIN TERPOLYMERS

BACKGROUND OF THE INVENTION

Lubricating oils used in internal combustion engines contain dispersants to maintain engine cleanliness. Typical of such dispersants are the succinimides described in U.S. Pat. No. 3,178,892 and the Mannich condensation products of U.S. Pat. Nos. 3,413,347 and 3,697,574. High molecular weight polyolefins containing polar groups have more recently been described which have both dispersant and viscosity lift properties. Typical of these are those described in U.S. Pat. Nos. 3,316,177; 3,326,804; 3,445,387; 3,388,067; 3,404,091; 3,404,092; 3,513,095; 3,687,849; 3,687,905; 3,756,954; 3,842,010; 3,872,019; 3,923,930; 4,002,569 and 4,032,700.

SUMMARY OF THE INVENTION

According to the present invention there is provided an ashless dispersant and viscosity lift additive for lubricating oils which is an oil-soluble olefin polymer derived from ethylene, $C_{3-12}$ α-monoolefins and $C_{5-14}$ non-conjugated dienes and containing pendent polar groups which are hydrocarbon segments formed from the non-conjugated diene units terminated with an amide group, an ester group or mixtures thereof.

DESCRIPTION OF THE PREFERRED EMBODIMENTS

A preferred embodiment of the invention is an oil-soluble ashless dispersant-viscosity improver for use in lubricating oil which is an olefin polymer having an average molecular weight of from about 10,000 to 1,000,000 comprising mainly polymerized ethylene and $C_{3-12}$ α-monoolefin units characterized by containing an average of about 1–10 pendent groups per each 10,000 molecular weight of said polymer, said pendent group being selected from groups having the formula

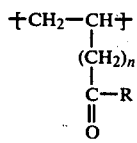
(A)

wherein n is an integer from 1 to 4 and R is an amine group containing 1–7 nitrogen atoms and 1–50 carbon atoms or an ester group derived from an alcohol containing 1–6 hydroxyl groups and 1–50 carbon atoms or a mixture of amine and ester groups,

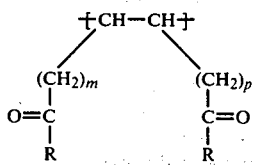
(B)

wherein m and p are integers from 2–4 and R is the same as above and

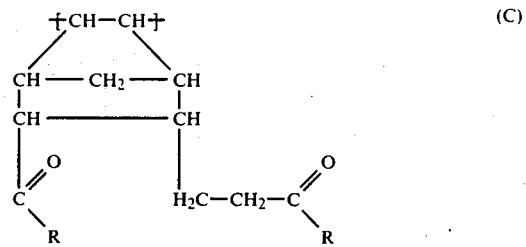
(C)

wherein R is the same as above.

The copolymers preferably contain about 30–84.5 mol % ethylene units, about 15–69.5 mol % α-olefin units and about 0.5–20 mol % diolefin units.

Examples of useful α-olefins include propylene, 1-butene, 1-pentene, 1-hexene, 1-octene, 1-decene and 1-dodecene. The most preferred α-olefin unit is derived from propylene which forms the unit —CH$_2$—CH(CH$_3$)—.

The polar groups are formed by oxidatively cleaving the residual olefinic double bond in the pendent hydrocarbon group formed by copolymerizing a non-conjugated diolefinic hydrocarbon with ethylene and a $C_{3-12}$ α-olefin. For example, if the diolefin is an acyclic non-conjugated diolefin such as 1,4-hexadiene, it will be oxidatively cleaved as follows

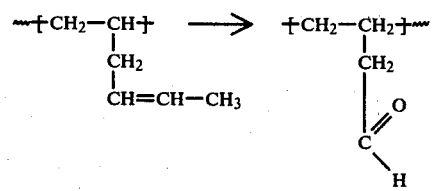

In this case the pendent group is an acetic acid group. The carboxylic group is converted to a polar amide or ester group by amidation or esterification. Hence, the pendent group formed from the non-conjugated diolefin includes acetamides, propionamides, butyroamides and the like. The amine portion, R, of the amide group includes amines containing 1–7 nitrogen atoms and 1–50 carbon atoms. These will be described later.

If the diolefin is a non-conjugated cyclic diolefin it will upon oxidative cleavage form two alkanoic acid groups on adjacent carbon atoms of the copolymer backbone. Thus, if 1,5-cyclooctadiene is used in making the copolymer, oxidative cleavage will form propionic acid groups on adjacent carbon groups as follows

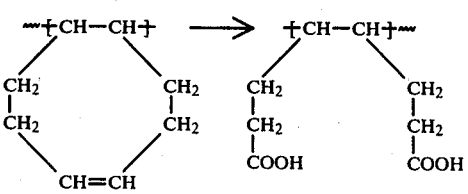

Upon amidation these groups will form propionamide groups and in the case of primary amines can form imides. Likewise, alkanols form esters. Mixtures of amines and alkanols form mixtures containing both amides (imides) and ester groups. Reactants containing both amine and hydroxyl functional groups will form mixtures containing both amide and ester groups. Examples of these latter reactants are ethanol amine, diethanol amine, N,N-diethanol ethylenediamine and the like.

When cyclopentadiene is used as the non-conjugated diolefin, oxidative cleavage of the residual double bond in the cyclopentadiene units will form dicarboxylic acid units having the formula

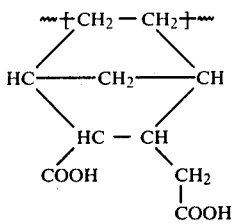

These are converted to amide and ester groups of Formula (C) by amidation or esterification. When primary amines are used both amides and imides form.

The ethylene/$C_{3-12}$ α-monoolefin/$C_{5-14}$ non-conjugated diolefin copolymers used as starting materials are more fully described in U.S. Pat. No. 4,032,700, incorporated herein by reference for its disclosure of the copolymers. Such copolymers are available commercially under such registered trademarks as "Ortholeum," "Nordel," a copolymer of ethylene, propylene and 1,4-hexadiene made by E. I. duPont deNemours and Company, Wilmington, Del. They are also available from Montedison, SPA, B. F. Goodrich Co., Copolymer Rubber and Chemical Corp.

The R groups in Formulae (A), (B) and (C) correspond to the residue of an amine or alkanol after it has formed an amide or ester. For example, ethylamine forms the R group —NH—$C_2H_5$ and ethanol forms the R group —$OC_2H_5$. When more complex amines and/or alkanols are used the structure of R will correspond to these amines and/or alkanols with a hydrogen removed from the nitrogen and/or oxygen atom bonded to the carbonyl unit. For example, if polyamino compounds are used, R will contain more than one nitrogen atom. Thus, a single R group can be bonded to one or more pendent carbonyl groups on the same polymer chain or on different polymer chains.

Useful amines from which R can be derived by forming at least one bond from a primary or secondary amino nitrogen atom to a pendent carbonyl group include those containing about 1–7 nitrogen atoms and about 1–50 carbon atoms. Representative examples of these are methylamine, dimethylamine, ethylamine, n-propylamine, n-butylamine, di-n-butylamine, isobutylamine, n-dodecylamine, didodecylamine, eicosylamine, triacontylamine, pentacontylamine and the like. Alkylene diamines are useful such as ethylenediamine, hexamethylenediamine, 1,2-propanediamine, N,N-dimethyl-1,3-propanediamine and N,N-diethyl-1,3-propanediamine. Of these, N,N-dimethyl-1,3-propanediamine is most preferred which forms the R group —NH—$CH_2$—$CH_2$—$CH_2$—N($CH_3$)$_2$.

A highly preferred class of amines consists of alkylene polyamines, also referred to as polyalkylene polyamines. These have the formula $H_2N$–(R'NH)$_z$H in which R' is a divalent hydrocarbon radical containing 2–4 carbon atoms and z is an integer from 1 to about 6. When these amines are bonded to a single carbonyl group through a primary amine nitrogen they form the R group —NH–(R'NH)$_z$H.

Examples of the above alkylene polyamines are ethylene diamine, diethylenetriamine, triethylenetetramine, tetraethylenepentamine, dipropylenetriamine, tripropylenetetramine, dibutylenetriamine, trimethylenediamine, di(trimethylene)triamine and the like including mixtures thereof. Expecially preferred are mixtures of polyethylenepolyamines which are commercially available and contain diethylenetriamine, triethylenetetramine, tetraethylenepentamine, and higher polyamines and also cyclic amines such as piperazine, N-aminoethylenepiperazine and the like.

Other useful amines include those having at least one hydrogen atom bonded to an amine nitrogen atom and containing 1–7 amino nitrogen atoms and 1–50 carbon atoms such as imidazole, morpholine, tetrahydropyrazine, indol, hexahydro-1,3,5-triazine, melamine, bis-(p-aminophenyl)methane, methane diamine, pyrrolidine, 3-amino-5,6-diphenyl-1,2,4-triazine, quinonedimine, 1,3-indandimine, 2-octadecyl-imidazoline, 2-phenyl-4-methyl-imidazolidine, oxazolidine, 2-heptyloxazolidine, urea, hydrazines, guanidines, amidines such as phenylhydrazine, N,N'-diphenylhydrazine, N-butyl urea, 1,3-diphenylguanidine, 1,2,3-tri-butylguanidine, N,N'-methylstearamidine, cyanamide, aminoguanidine and the like.

Alkanols form R groups by removal of a hydrogen atom from at least one hydroxyl group and bonding of the oxygen atom to a pendent carbonyl group. For example, methanol forms the methoxy group and ethanol forms the ethoxy group. These R groups bond to the pendent carbonyl to form carboxylic ester groups. Other similar R groups are formed from alkanols including those containing 1–6 hydroxyl groups and 1–50 carbon atoms such as isopropanol, n-butanol, isobutanol, 2-ethylhexanol, n-octanol, 2-dodecanol, 1-eicosanol, 1-pentacosanol and the like. Likewise, R groups can be derived from polyols such as ethyleneglycol, diethyleneglycol, triethyleneglycol, propyleneglycol, dipropyleneglycol, triethanolamine, tripropyleneglycol, tetrapropyleneglycol, glycerol and the like. In a highly preferred embodiment the R group is formed from a hindered polyol such a trimethylolpropane, trimethylolethane, pentaerythritol and the like. Higher polyols such as mannitol or sorbitol are also useful.

The above polyols can form an R group bonded to a single carbonyl or can be bonded to two or more carbonyls which are pendent from the same or different polymer backbones.

R can be derived from a precursor containing both hydroxyl and amino groups. In this case, R can be bonded to the pendent carbonyl group through nitrogen or oxygen to form either an amide (imide) or ester group. For example, diethanol amine can form both the amine group —N($C_2H_4$OH)$_2$ and the oxy group —O—$C_2H_4$—NH—$C_2H_4$OH resulting in both amides and esters. Examples of other compounds that can form either type R group are N,N-diethanolethylenediamine, aminoethylaminoethoxyethanol, di(aminoethyl)aminoethanol, N-(2-hydroxyethyl)ethylenediamine, N,N'-bis(2-hydroxyethyl)ethylenediamine, 1-(2-hydroxyethyl)piperazine, 1,4-bis(2-hydroxypropyl)piperazine, di-hydroxypropyltetraethylenepentamine, N-(3-hydroxypropyl)-tetramethylenediamine, 2-heptadecyl-1-(2-hydroxyethyl)imidazoline and the like.

The most preferred embodiment of the invention is a polymer having an average molecular weight of about 10,000–1,000,000 consisting essentially of the units

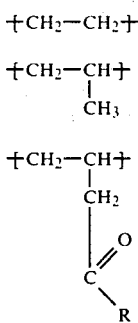

wherein said polymer contains about 30–84.5 mol % of (a) units, about 15–69.5 mol % of (b) units and about 0.5–20 mol % of (c) units and R is an amine group containing 1–7 nitrogen atoms and 1–50 carbon atoms.

This most preferred embodiment is made from a copolymer of 30–84.5 mol % ethylene, about 15–69.5 mol % propylene and about 0.5–20 mol % 1,4-hexadiene by oxidative cleavage of the residual unpolymerized double bond of the 1,4-hexadiene to form a carboxylic acid group which is amidated with an amine having at least one hydrogen atom bonded to nitrogen and containing 1–7 nitrogen atoms and 1–50 carbon atoms. Any of the previously described amines are satisfactory, but the preferred amines are N,N-di-$C_{1-4}$ alkyl-1,3-propanediamine (e.g. N,N-dimethyl-1,3-propanediamine) and the polyethylenepolyamines (e.g. diethylenetriamine, triethylenetetramine, tetraethylenepentamine, and the like, including crude mixtures thereof containing cyclic amines such as piperazine, N-aminoethylpiperazine and the like). Group R will correspond to any of these amines with a hydrogen atom removed from a primary or secondary, preferably primary, amino group which amino group is bonded to the carbonyl forming an amide.

The additives are made by the oxidative cleavage of the residual olefinic double bond in the pendent hydrocarbon group in the copolymer which results from incorporating into the copolymer a non-conjugated diolefin. Only one of the double bonds of the diolefin partakes in the copolymerization leaving the other double bond, referred to as the residual double bond, in a pendent hydrocarbon group. Oxidation of this residual double bond can be accomplished by reaction with permanganate anion. These anions are readily provided in the form of a water-soluble permanganate salt, preferably an alkali metal permanganate such as $NaMnO_4$, $KMnO_4$ and the like. Since the permanganate salt is water soluble it does not enter into the organic phase to any extent. The oxidation, therefore, requires the presence of a phase transfer catalyst. These are quaternary ammonium salts, quaternary phosphonium salts and the crown ethers such as dicyclohexyl-18-crown-6. Oxidation of olefinic double bonds employing such phase transfer catalysts is described by D. J. Sam and H. F. Simmons, JACS, 94, 4024 (1972) and C. M. Starks, JACS, 93, 195 (1971).

Representative phase transfer catalysts are tetrabutylammonium bromide, benzyltriethylammonium chloride, dodecyltributylammonium bisulfate, tetrabutylammonium bisulfate, tetrabutylphosphonium bromide, benzyltributylphosphonium chloride, dodecyltripropylphosphonium bisulfate, methyltributylammonium chloride and the like.

The preferred phase transfer catalysts are the quaternary ammonium salts. Preferably, the ammonium anion contains a total of about 10–30 carbon atoms as alkyl and/or aralkyl groups. Examples of these preferred catalysts are dibutyldimethylammonium bisulfate, n-decyltrimethylammonium bromide, n-dodecyltrimethylammonium chloride, and the like.

The amount of phase transfer catalyst should be an amount sufficient to cause permanganate anions to migrate into the organic phase. It is believed that the catalyst causes this by forming an organic soluble ion pair with the permanganate anion. An amount of about 0.5 to 10 wt % phase transfer catalyst based on the weight of the organic phase is usually sufficient.

The alkali metal permanganate is preferably used as an aqueous solution. Alternatively, water can be mixed with the organic phase and solid alkali metal permanganate added. The amount of alkali metal permanganate should be at least sufficient to oxidize a substantial amount of the residual double bond to carboxylic acid groups. This should be an amount sufficient to oxidize at least 25% of the residual double bonds to carboxylic acid. More preferably, it is an amount adequate to oxidize at least 50% of the double bonds to carboxylic acid. Most preferably, the amount of permanganate anion is an amount which is about 1–10 stoichiometric equivalents of the amount required to complete the oxidation of all of the residual double bonds in the copolymer to carboxylic acid groups.

The amount of water in the system is not critical, but is preferably an amount sufficient to dissolve the alkali metal permanganate. Large amounts of excess water are undesirable because they retain permanganate anion in the aqueous phase. An amount equivalent to 1–2 times the amount required to dissolve the alkali metal permanganate is a useful range.

The copolymer is a very viscous rubbery material by itself so the reaction is conducted in an inert solvent. Useful solvents include the aliphatic hydrocarbons such as hexane, heptane and the like. The halogenated aliphatic hydrocarbons are more preferred such as dichloromethane, chloroform, carbon tetrachloride, 1,1,2-trichloroethane, dibromomethane, tribromomethane, dibromomethane, 1,2-dibromopropane and the like. Halogenated aromatics are very useful as solvents, especially chlorobenzene.

The amount of solvent should be adequate to dissolve the copolymer and lower the viscosity to a level such that the solution can be easily stirred. A useful range is about 6 to 30 parts of inert solvent per each 1 part of copolymer.

The oxidation is conducted at a temperature high enough to cause the oxidation of the residual double bonds to carboxylic acid groups. A useful temperature range is about 0°–100° C., a preferred temperature range is about 40°–50° C.

The reaction can be conducted in a sealed vessel under pressure if this is required to attain the desired reaction temperature. With high boiling solvents such as chlorobenzene, above atmospheric pressures are usually not required. However, such pressures can be used if the reaction temperature so requires.

Following the above directions the oxidative cleavage is carried out by stirring a mixture containing the ethylene/$C_{3-12}$ α-monoolefin/$C_{5-14}$ non-conjugated diolefin copolymer in an inert solvent and adding to it the phase transfer catalyst, water and the alkali metal permanganate. Upon completion of the oxidation the permanganate anion forms manganese dioxide which can be filtered off or extracted with aqueous HCl.

Following the oxidative cleavage the carboxylic acid groups are converted to amide (or imide) or ester groups by reaction with an amine, alcohol, aminoalcohol or mixtures thereof. Reactions such as this are well known and do not require extensive description. In making the amide a primary or secondary amine is added to the carboxylated copolymer in an inert solvent and the mixture heated to form the amide and possibly imide evolving water. The amount of amine added should be enough to provide at least one equivalent of reactive amine per carboxylic acid group. An equivalent of reactive amine is the molecular weight of the amine divided by the number of primary or secondary amine groups—that is, amine groups having at least one hydrogen atom bonded to amino nitrogen. For example, the equivalent weight of N,N-dimethyl-1,3-propanediamine is 102, the same as the mol weight since there is only one reactive amine group. In contrast, the equivalent weight of tetraethylenepentamine is 39.8 since it has a molecular weight of 199 and contains 5 reactive amine groups.

More preferably, the amount of amine is sufficient to supply at least one equivalent of primary amino nitrogen per equivalent of carboxylic acid in the copolymer. In the case of N,N-dimethyl-1,3-propanediamine this would be the same 102, but in the case of tetraethylenepentamine this would be 99.5 or one-half of the molecular weight.

In the most preferred embodiment the amount of amine is at least one mol per equivalent of carboxylic acid. There is no real upper limit since a large excess of amine may be used and merely washed out after the reaction. For the sake of economy, a preferred maximum is about two mols per equivalent of carboxylic acid.

The mixture is then heated to a temperature high enough to cause the formation of amide and/or imide groups. A useful temperature range is about 80°–250° C. A more preferred temperature range is about 170°–200° C.

Water is evolved during the reaction. The reaction is promoted by removing the water as formed. They can be done by conducting the reaction above the boiling point of water. Likewise, the amidation can be conducted in a refluxing inert solvent such as toluene or xylene which can serve to remove water by co-distillation. The water can be removed from the distillate in a water trap and the inert solvent recycled.

Another method is to include a chemical which can act as a water scavenger by reacting with the water as it forms. An example of such compound is N,N-dicyclohexylcarbodiimide.

Following amidation excess amine is washed out using dilute aqueous HCl. An oil diluent is then added as the volatile solvents are distilled out. The final product is an oil solution containing about 3–20 wt % of the amidated product.

Esterification is carried out in a similar manner. An alkanol is added to the carboxylated copolymer in an inert solvent. The amount of alkanol should be enough to supply about one equivalent of hydroxyl per equivalent of carboxylic acid. Amounts up to about one mol of alkanol per equivalent of carboxylic acid can react. Excess amounts can be used and removed following esterification. For the sake of economy the amount is best kept below about two mols of alkanol per equivalent of carboxylic acid.

The mixture is heated to a temperature sufficient to cause esterification. A standard esterification catalyst can be used if desired such as sulfuric acid, p-toluene sulfonic acid, methane sulfonic acid and the like. A temperature of about 80°–250° C. is a useful reaction range. Water is formed during the esterification and is preferably removed. This can be done by conducting the esterification in a refluxing solvent and co-distilling the water with the solvent. Alternatively, the reaction can be conducted at a temperature high enough to drive the water off as it forms. A preferred temperature range is about 170°–200° C.

Following the esterification any excess alkanol is removed by distillation, filtration or water wash following which the volatile solvents are distilled out and oil diluent added such that the final product is an oil solution containing about 3–20 wt % esterified copolymer.

The following example illustrates the manner of making the amidated copolymer.

EXAMPLE 1

Permanganate Oxidation

In a reaction vessel was placed 11.6 gms of ethylene/propylene/1,4-hexadiene copolymer having an average molecular weight of 100,000 consisting essentially of about 68.3 mol % ethylene units, 30.2 mol % propylene units and 1.5 mol % 1,4-hexadiene units which contain about 3 pendent unsaturated hydrocarbon groups per each 10,000 molecular weight. To this was added 300 ml chlorobenzene and the mixture stirred at 100°–140° C. until the copolymer dissolved. At that time 1.5 gms of tetrabutylammonium bisulfate was added as a phase transfer catalyst. A solution of 4 gms of $KMnO_4$ in 75 ml of water was added slowly. A small initial portion was added at 80° C. and the remainder at 40°–50° C. Stirring was continued for two hours and then the reaction mixture was heated to 100° C. and then cooled. The $MnO_2$ which formed was dissolved by adding a solution of 100 ml water, 10 ml 37% HCl and 3 gms sodium bisulfite followed by another 100 ml water. The aqueous extract was removed and the organic phase washed twice with 1% aqueous HCl.

Amidation

The organic phase was diluted with 100 ml toluene and refluxed using a water trap to dry the solution. Then 0.75 gm of N,N-dimethyl-1,3-propanediamine and 1.35 gms of N,N-dicyclohexyl carbodiimide was added. The mixture was stirred 19 hours at 80° C. The solution was then filtered and the filtrate diluted with 600 ml heptane. The solution was washed with 500 ml water and the organic phase dried over magnesium sulfate. It was then filtered. A portion of the solution was removed and evaporated under vacuum to obtain 2.19 gms of product for analysis. It analyzed 1.36 wt % nitrogen.

Mineral oil (95.9 gms) was added to the remaining solution and volatile solvents were stripped using a thin film evaporator at 150° C. giving an oil solution containing 4.44 wt % of the additive.

Viscosity Lift

Mineral oil compositions were prepared containing various amounts of the active additive. The viscosity of these oil compositions was measured at 100° F. and 210°

F. and the viscosity index calculated. Results are shown in the following table.

| Additive (wt %) | Viscosity 100° F. | Viscosity 210° F. | Viscosity Index |
|---|---|---|---|
| 0.70 | 58.27 | 8.32 | 113 |
| 1.04 | 73.53 | 10.07 | 119 |
| 1.26 | 84.99 | 11.35 | 123 |

Oil Dispersancy

Tests were conducted to measure the dispersant activity of the additive in lubricating oil. A 100 ml oil sample was prepared containing 7 gms of typical engine sludge, 2 gms water and varying concentrations of the amidated copolymer additive. This mixture was stirred vigorously in a blender to disperse the sludge and then centrifuged for 2.5 hours at 2,000 rpm to accelerate sludge settling. Then a small amount of oil was withdrawn from just beneath the surface and the percent light transmittance of the sample was measured photoelectrically. The more effective the additive in keeping sludge dispersed the lower will be the amount of transmitted light. In the absence of a dispersant the test would indicate about 70-90% light transmittance indicating that most of the sludge had settled from the oil surface leaving the oil transparent.

The following table gives the results obtained with the amidated copolymer.

| Additive (wt %) | Light Transmittance |
|---|---|
| 0.3 | 75% |
| 0.6 | 21% |
| 1.2 | 3.5% |

These results show that the additive is an effective lubricating oil dispersant at a concentration of 0.6 wt %.

This example illustrates the manner of making the esterified copolymer.

EXAMPLE 2

Prepare the carboxylated copolymer following the permanganate oxidation procedure in Example 1. Add 100 ml xylene to the oxidized intermediate and then add 8.8 gms of pentaerythritol and 1 gm p-toluene sulfonic acid. Stir the mixture at reflux for 8 hours using a Dean-Stark water trap to remove water from the distillate. Cool to about 50° C. and filter. Add 500 ml heptane and wash twice with water. Dry over magnesium sulfate and filter. Distill out solvent until the mixture begins to become viscous and then add 100 gms solvent refined 100 SUS mineral oil. Continue distilling under vacuum to remove volatiles leaving an oil solution of the esterified copolymer.

The additives of this invention are useful in a broad range of mineral oils. They provide both dispersant and viscosity lift properties when used in amounts such that the lubricating oil contain about 0.1-10 wt % and more preferably about 0.5-3 wt % of the active additive not including any inert diluent used to aid handling. Other conventional additives may be used in the lubricating oil compositions such as alkaline earth metal sulfonates (e.g. overbased calcium alkaryl sulfonate having 300 TBN), zinc dialkyl dithiophosphate, polyalkylmethacrylate VI improver, ethylene propylene copolymer VI improver, alkaline earth salts of phosphosulfurized polyisobutylene, phenolic antioxidants such as 4,4'-methylenebis(2,6-di-tert-butylphenol) and the like.

The base lubricant can be a mineral oil or it can be a synthetic oil. Useful synthetic oils include ester lubricants such as diesters of dicarboxylic acids (e.g., di-2-ethylhexyl adipate), polyol esters (e.g., trimethylolpropane, tripelargonate) and complex esters made from polyols, polycarboxylic acid with monoalkanol and/or monocarboxylic acid end groups.

Alkyl benzenes can be used as the base lubricant such as octadecylbenzene, didodecylbenzene and the like.

Olefin oligomers are very useful base lubricants. Examples of these are $C_{6-14}$ α-olefin trimers and tetramers. An especially useful oligomer is composed mainly of trimers and tetramers of α-decene.

Blends of mineral oil with synthetic lubricants are frequently used as the base lubricant. For example, a blend of about 10-25 weight percent α-decene trimer/tetramer mixture with 100 SUS neutral oil can be used as a base stock for formulating a 5W30 lubricating oil. In a similar manner blends of mineral oil plus ester, oligomer plus ester, alkylbenzene plus ester, oligomer plus alkylbenzene, mineral oil plus alkylbenzene, mineral oil plus oligomer plus ester, and the like can be used as the base stock.

The following example illustrates the formulation of a lubricating oil suitable for use in an automotive crankcase.

EXAMPLE 3

In a blending vessel place 1000 gal 100 SUS solvent refined neutral oil. To this add 1000 lbs of the additive of Example 1, commercial zinc dialkyl dithiophosphate to provide 0.07 wt % zinc and 300 TBN overbased calcium alkaryl sulfonate to provide 0.5 wt % calcium. Blend the mixture until homogeneous and package for use.

I claim:
1. A process for making an oil-soluble ashless dispersant-viscosity improver for use in lubricating oil, said process comprising
   (a) dissolving an olefin polymer in an inert solvent, said polymer having a molecular weight of about 10,000-1,000,000 and being an interpolymer of ethylene, a $C_{3-12}$ monoolefin and a $C_{5-14}$ acyclic or alicyclic non-conjugated diolefin, said non-conjugated diolefin introducing pendent hydrocarbon groups into said interpolymer, said pendent hydrocarbon groups containing an olefinic double bond,
   (b) adding to said polymer solution an aqueous solution of an alkali metal permanganate and a phase transfer catalyst selected from the group consisting of quaternary ammonium salts and quaternary phosphonium salts,
   (c) stirring the resultant mixture until at least 25% of said olefinic double bonds are oxidized to carboxylic acid groups, and
   (d) reacting the resultant polymer containing said carboxylic acid groups with a compound selected from the group consisting of amines containing about 1-7 nitrogen atoms and 1-50 carbon atoms, alkanols containing about 1-6 hydroxyl groups and 1-50 carbon atoms, aminoalkanols containing 1-5 nitrogen atoms, 1-6 hydroxyl groups and 1-50 carbon atoms and mixtures thereof
to convert said carboxylic acid groups to amide, imide or ester groups.

2. A process of claim 1 wherein said α-monoolefin is propylene.

3. A process of claim 2 wherein said non-conjugated diolefin is 1,4-hexadiene.

4. A process of claim 3 wherein said phase transfer catalyst is a quaternary ammonium salt.

5. a process of claim 4 wherein said compound is said amine containing 1–7 nitrogen atoms and 1–50 carbon atoms.

6. A process of claim 5 wherein said amine is N,N-dimethyl-1,3-propanediamine.

7. A process of claim 5 wherein said amine is an alkylene polyamine having the formula $$H_2N+R'-NH+_zH$$

wherein R′ is a divalent hydrocarbon radical containing 2–4 carbon atoms and z is an integer from 1–6.

8. A process of claim 7 wherein R′ is —CH$_2$—CH$_2$—.

9. A carboxylic acid substituted polymer made by the process comprising
(a) dissolving an olefin polymer in an inert solvent, said polymer having a molecular weight of about 10,000–1,000,000 and being an interpolymer of ethylene, a C$_{3-12}$ monoolefin and a C$_{5-14}$ acyclic or alicyclic non-conjugated diolefin, said non-conjugated diolefin introducing pendent hydrocarbon groups into said interpolymer, said pendent hydrocarbon groups containing an olefinic double bond,
(b) adding to said polymer solution an aqueous solution of an alkali metal permanganate and a phase transfer catalyst selected from the group consisting of quaternary ammonium salts and quaternary phosphonium salts, and
(c) stirring the resultant mixture until at least 25% of said olefinic double bonds are oxidized to carboxylic acid groups.

10. A product of claim 9 wherein said alkali metal permanganate is potassium permanganate.

11. A product of claim 9 wherein said non-conjugated diolefin is 1,4-hexadiene.

12. A product of claim 11 wherein said phase transfer catalyst is tetraalkyl ammonium bisulfate.

13. An oil soluble additive having dispersant and viscosity improving properties in lubricating oil, said additive made by the process comprising
(a) dissolving an olefin polymer in an inert solvent, said polymer having a molecular weight of about 10,000–1,000,000 and being an interpolymer of ethylene, a C$_{3-12}$ monoolefin and a C$_{5-14}$ acyclic or alicyclic non-conjugated diolefin, said non-conjugated diolefin introducing pendent hydrocarbon groups into said interpolymer, said pendent hydrocarbon groups containing an olefinic double bond,
(b) adding to said polymer solution an aqueous solution of an alkali metal permanganate and a phase transfer catalyst selected from the group consisting of quaternary ammonium salts and quaternary phosphonium salts,
(c) stirring the resultant mixture until at least 25% of said olefinic double bonds are oxidized to carboxylic acid groups, and
(d) reacting the resultant polymer containing said carboxylic acid groups with a compound selected from the group consisting of primary and secondary amines containing about 1–7 nitrogen atoms and 1–50 carbon atoms, alkanols containing about 1–6 hydroxyl groups and 1–50 carbon atoms, aminoalkanols containing 1–5 nitrogen atoms, 1–6 hydroxyl groups and 1–50 carbon atoms and mixtures thereof to convert said carboxylic acid groups to amide, imide or ester groups.

14. An additive of claim 13 wherein said alkali metal permanganate is potassium permanganate.

15. An additive of claim 13 wherein said non-conjugated diolefin is 1,4-hexadiene.

16. An additive of claim 15 wherein said phase transfer catalyst is tetraalkyl ammonium bisulfate.

17. An additive of claim 16 wherein said compound in step (d) is a primary or secondary amine containing about 1–7 nitrogen atoms and 1–30 carbon atoms.

18. An additive of claim 17 wherein said amine is N,N-dimethyl-1,3-propanediamine.

19. An additive of claim 17 wherein said amine is an alkylene polyamine having the formula $$H_2N+R'-NH+_zH$$

wherein R′ is a divalent hydrocarbon radical containing 2–4 carbon atoms and z is an integer from 1–6.

20. An additive of claim 19 wherein R′ is —CH$_2$—CH$_2$—.

21. Lubricating oil containing about 0.1–10 weight percent of an additive made by the process comprising
(a) dissolving an olefin polymer in an inert solvent, said polymer having a molecular weight of about 10,000–1,000,000 and being an interpolymer of ethylene, a C$_{3-12}$ monoolefin and a C$_{5-14}$ acyclic or alicyclic non-conjugated diolefin, said non-conjugated diolefin introducing pendent hydrocarbon groups into said interpolymer, said pendent hydrocarbon groups containing an olefinic double bond,
(b) adding to said polymer solution an aqueous solution of an alkali metal permanganate and a phase transfer catalyst selected from the group consisting of quaternary ammonium salts and quaternary phosphonium salts,
(c) stirring the resultant mixture until at least 25% of said olefinic double bonds are oxidized to carboxylic acid groups, and
(d) reacting the resultant polymer containing said carboxylic acid groups with a compound selected from the group consisting of primary or secondary amines containing about 1–7 nitrogen atoms and 1–50 carbon atoms, alkanols containing about 1–6 hydroxyl groups and 1–50 carbon atoms, aminoalkanols containing 1–5 nitrogen atoms, 1–6 hydroxyl groups and 1–50 carbon atoms and mixtures thereof to convert said carboxylic acid groups to amide, imide or ester groups.

22. A composition of claim 21 wherein said alkali metal permanganate is potassium permanganate.

23. A composition of claim 21 wherein said non-conjugated diolefin is 1,4-hexadiene.

24. A composition of claim 23 wherein said phase transfer catalyst is tetraalkyl ammonium bisulfate.

25. A composition of claim 24 wherein said compound in step (d) is a primary or secondary amine containing about 1–7 nitrogen atoms and 1–30 carbon atoms.

26. A composition of claim 25 wherein said amine is N,N-dimethyl-1,3-propanediamine.

27. A composition of claim 25 wherein said amine is an alkylene polyamine having the formula $$H_2N+R'-NH+_zH$$

wherein R′ is a divalent hydrocarbon radical containing 2–4 carbon atoms and z is an integer from 1–6.

28. A composition of claim 27 wherein R′ is —CH$_2$—CH$_2$—.

* * * * *

UNITED STATES PATENT AND TRADEMARK OFFICE
CERTIFICATE OF CORRECTION

PATENT NO. : 4,152,276
DATED : May 1, 1979
INVENTOR(S) : Philip F. Jackisch

It is certified that error appears in the above-identified patent and that said Letters Patent are hereby corrected as shown below:

Column 2, lines 30-35 - that portion of the right-hand formula reading:

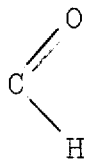   should read   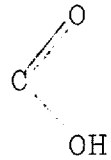

Signed and Sealed this

Seventeenth Day of July 1979

[SEAL]

Attest:

LUTRELLE F. PARKER
Attesting Officer    Acting Commissioner of Patents and Trademarks